United States Patent [19]

Baker et al.

[11] Patent Number: 4,707,142
[45] Date of Patent: Nov. 17, 1987

[54] MASTER CLOCK SYSTEM FOR A PARALLEL VARIABLE SPEED CONSTANT FREQUENCY POWER SYSTEM

[75] Inventors: Donal E. Baker, American Township, Allen County; Mirza A. Beg, Lima, both of Ohio

[73] Assignee: Westinghouse Electric Corp., Pittsburgh, Pa.

[21] Appl. No.: 938,652

[22] Filed: Dec. 5, 1986

[51] Int. Cl.[4] .......................... G04C 11/00; H02J 1/00
[52] U.S. Cl. ........................................ 368/46; 307/87
[58] Field of Search ...................... 368/46, 48, 52, 56, 368/59; 307/44, 46, 48, 64, 66, 87; 328/133; 363/78, 85

[56] References Cited

U.S. PATENT DOCUMENTS

| | | | |
|---|---|---|---|
| 3,321,693 | 5/1967 | Heinrich et al. | 321/5 |
| 3,381,205 | 4/1968 | Howell et al. | 321/18 |
| 3,657,633 | 4/1972 | Urish | 321/9 A |
| 4,429,233 | 1/1984 | Kamiluer | 307/87 |
| 4,516,035 | 5/1985 | Rhoads et al. | 307/87 |
| 4,520,319 | 5/1985 | Baker | 328/133 |

*Primary Examiner*—Vit W. Miska
*Attorney, Agent, or Firm*—R. P. Lenart

[57] ABSTRACT

A clock control system for a multiple channel electric power system includes a master clock circuit and control circuitry in each parallel connected channel. The channel control circuits are intially phase-locked to a master clock signal. If the master clock signal is out of a preselected frequency range, the individual channel control circuits are decoupled from the master clock signal and one of those circuits produces a backup clock signal. The control circuits in the remaining channels are then phase-locked with the backup clock signal to provide continued parallel system operation.

7 Claims, 4 Drawing Figures

MASTER CLOCK SYSTEM FOR A PARALLEL VARIABLE SPEED CONSTANT FREQUENCY POWER SYSTEM

BACKGROUND OF THE INVENTION

This invention relates to control circuitry for parallel connected electronic power systems and more particularly, to a master clock system for a parallel connected variable speed constant frequency power system.

AC electric power systems are usually connected in parallel to increase total system rating or in certain cases such as airborne power systems, to increase reliability. One well known type of aircraft electric power system is the DC link variable speed constant frequency (VSCF) system. Such systems include a plurality of power pole switching elements which synthesize an AC output by switching current from a pair of DC link conductors in a fixed switching pattern, which may be generated by a microprocessor or other digital circuit. When these systems are to be operated in parallel with each other or with another source such as a ground power cart, each of the power sources must be synchronized. Since DC link VSCF systems are clock based, a master clock signal is used to synchronize all of the channels.

No break power transfer (NBPT) is a special case application of a parallel power system which allows momentary paralleling with an external power source. For aircraft applications, the other source is typically an auxiliary power unit (APU) or a ground power unit (GPU). These units are typically constant speed synchronous type generators having a frequency tolerance of at least five percent (5%). Therefore, to provide for no break power transfer, a master clock in the DC link VSCF system must be able to track the frequency of the external power source. The present invention seeks to provide a master clock system for parallel connected VSCF power systems which is capable of tracking the frequency of an external power source and also includes a backup clock which can maintain system operation in the event of a failed master clock.

SUMMARY OF THE INVENTION

An electrical power system having a clock control system constructed in accordance with the present invention includes a clock circuit and at least two paralleled channels, each having a control circuit. The channels are phase locked to a clock signal produced by the clock circuit. This clock signal is monitored by each channel and all channels are decoupled from the clock signal if any channel determines that the clock signal is beyond a preselected frequency range. When this occurs, one of the channel control circuits produces a signal which is used as a backup clock signal. The other channel(s) then become phase locked to this backup clock signal.

DESCRIPTION OF THE PREFERRED EMBODIMENT

Figure 1:
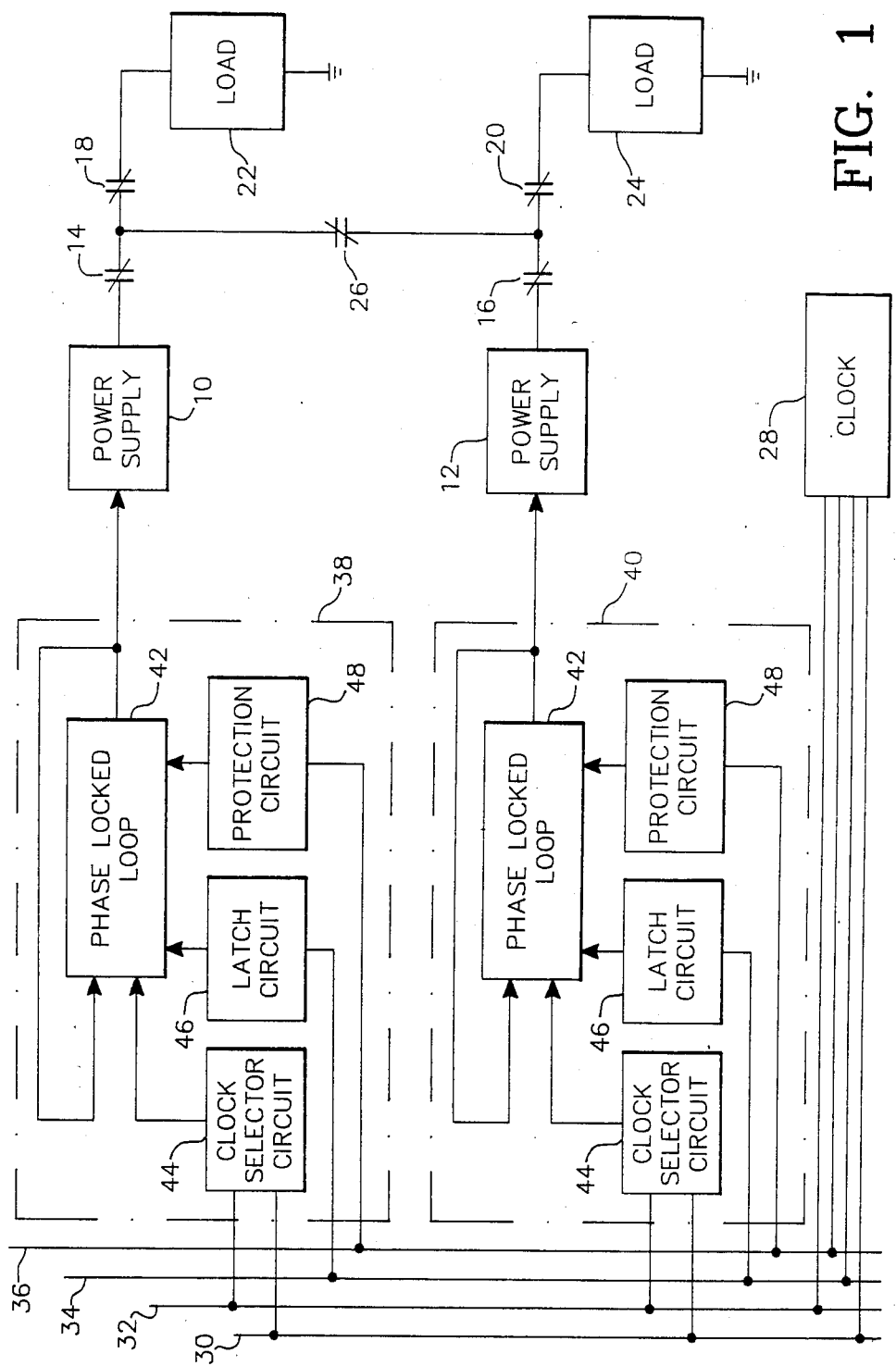
FIG. 1 is a block diagram of a two channel parallel electric power system having a clock system which is constructed in accordance with one embodiment of the present invention.

Referring to the drawings, FIG. 1 is a block diagram of a parallel electric power system including a clock system in accordance with one embodiment of the present invention. This system includes a pair of clock based power supplies 10 and 12 which may be, for example, DC link variable speed constant frequency power supplies. For the purposes of this discussion, clock based power supplies are defined as power supplies in which the frequency of the output is controlled by a clock signal. The outputs of these power supplies are generally multiple phase and are connected through a series of contactors 14, 16, 18 and 20 to a plurality of loads 22 and 24. A bus tie breaker 26 serves as means for electrically connecting the outputs of these power supplies in parallel.

The clock system of the present invention includes a clock circuit 28 which is connected by way of control lines 30, 32, 34 and 36 to individual channel control circuits 38 and 40. In a typical airborne power system application, the individual channel frequency control circuits would be located in the individual channel control units while the clock circuit 28 would typically reside in the bus protection control unit (BPCU). In the clock-based system of this invention, the clock provides a single digital synchronizing signal to all channel control units. The clock can be either a fixed frequency reference such as a crystal reference or a variable frequency which may be connected to track another source such as an auxiliary power unit or a ground power unit to accomplish no break power transfer. Each of the individual channel control circuits includes a phase locked loop 42, a frequency selector circuit 44, a latch circuit 46 and a protection circuit 48.

Paralleling control circuits used in DC link VSCF systems require a clock signal which is common to all channels. This signal synchronizes all channels whether or not the system is operating in the parallel mode. A typical synchronizing signal is a 400 Hz, 15 volt, unidirectional squarewave. In the present invention, the synchronizing signal could be supplied by the clock circuit in the bus protection control unit or by one of the individual channel control circuits functioning in the backup clock mode.

Figure 2:
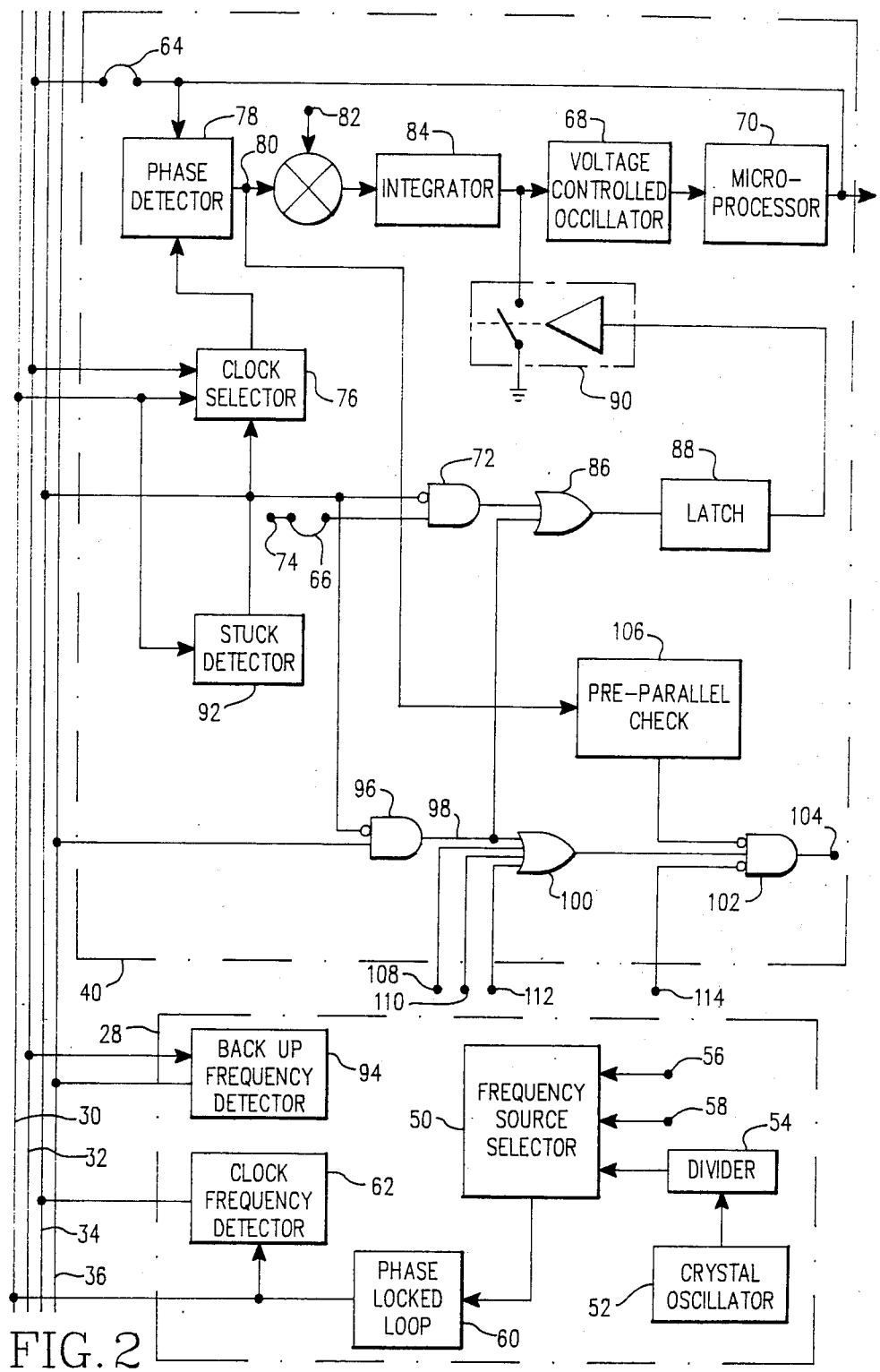
FIG. 2 is a functional block diagram of the clock and one of the channels of the system of FIG. 1.

FIG. 2 provides a functional block diagram of the clock circuit and one of the channel control circuits of FIG. 1. The clock circuit 28 resides in the bus protection control unit of the power system and provides a common clock signal to each of the generator control units by way of control line 30. The frequency source selector 50 provides a switching system with which one of three available frequency sources may be selected. For example, a crystal oscillator 52 may be connected to the clock selector through an appropriate frequency divider 54, an auxiliary power unit may be connected to terminal 56, or a ground power unit may be connected to terminal 58. This system would normally run on the internal crystal oscillator and would be switched to the APU/GPU only during no break power transfer.

A phase-locked loop 60 is provided in the clock circuit so that the frequency of the external power sources such as an auxiliary power unit or a ground power unit can be tracked for no break power transfer. In the event of a noise disturbance or momentary loss of the selected frequency reference, the phase-locked loop approach provides some inertia to the clock frequency and thereby prevents severe frequency and/or phase angle transients which might otherwise appear on the paralleled bus or upset the paralleling control circuits. Similarly, the transients associated with the change of frequency reference are smoothed out by the phase-locked loop. Furthermore, the inertia of the clock can be controlled independently from the inertia already residing in the paralleling controls in the channel control units. This allows some flexibility in the design of the system frequency slew rate without significantly affecting the performance of the paralleling controls.

Another important benefit of the phase-locked loop is that if the frequency reference assumes an unacceptable value, the phase-locked loop is designed to limit the clock frequency to fall within the system capability, for example, 400±40 hertz. It is desirable to have a clock frequency range which is less than the frequency range of the control circuits in the generator control units. This prevents the loss of parallel operation of the system and subsequent tripping of the channels from the paralleled bus if the selected frequency reference is defective. For this reason, the clock phase-locked loop having an output frequency range of 400±35 hertz is compatible with a generator control unit phase-locked loop capability of 400±40 hertz.

In FIG. 2, the individual channel control circuit 40 can be called upon to serve as the backup clock. The backup clock is needed if the system is required to continue running in the parallel mode while the clock is failed. This backup clock is wired to all of the generator control units by way of control line 32. The backup clock is enabled only when the clock fails for any reason. This is accomplished by clock frequency detector 62 in the bus protection control unit and by stuck detectors 92 in the channel control circuits. If the clock signal is out of a predetermined frequency range, or is stuck, the clock fail line, 34, is pulled low and latched by any of the channel control circuits in the generator control units or by the clock frequency detector in the bus protection control unit.

Individual channel control circuit 40 is delegated to serve as the backup clock source by inserting jumpers 64 and 66. Jumper 64 connects a locally generated signal from the output of a microprocessor 70 to the backup clock line 32. Microprocessor 70 is part of the VSCF switching pattern waveform generator of the VSCF power source. Its function with respect to this invention is to produce a 400 Hz signal from the relatively high output frequency of the voltage controlled oscillator 68. Jumper 66 connects an input of AND gate 72 to a logic high level on terminal 74. Since the channel shown in FIG. 2 is connected to serve as the backup, when the clock fails, AND gate 72 produces a signal which passes through OR gate 86 and energizes latch 88, thereby closing analog switch 90 which then forces the voltage controlled oscillator 68 to operate at its center frequency so that it can be used as a fixed frequency backup clock. It should be understood that any one of the generator control units can be made to provide the backup clock by simply inserting jumpers 64 and 66.

For channels which are not delegated to be the backup clock source, a failed clock condition will not alter their performance except that the backup clock signal on line 32 will be selected as the synchronizing signal. This is initiated when failed clock line 34 goes low, indicating a failed clock. In that case, clock selector 76 switches the backup clock signal on line 32 which becomes the new input to the phase detector 78. Then the phase detector compares the backup clock signal with the output of microprocessor 70 to produce a phase error signal on line 80 which is then combined with a reference voltage 82 to produce a signal which is integrated by integrator 84 and fed to the input of voltage controlled oscillator 68.

To protect the system in the event of a failure in the backup clock circuit, a backup frequency detector 94 in the bus power control unit monitors the backup clock signal on control line 32 and places a backup clock failure signal on control line 36 if the backup clock signal is out of a predetermined frequency range. Then a clock failure signal on control line 34 and a backup clock failure signal on line 36 are delivered to AND gate 96 which produces a bus isolation signal on line 98. The bus isolation signal will then operate through OR gate 86 and latch 88 to cause the channel to operate on its own VCO center frequency. At the same time, the bus isolation signal will operate through OR gate 100 and AND gate 102 to produce a bus tie breaker trip signal on terminal 104, thus removing the channel from the parallel bus. All channels will similarly be removed from the parallel bus. This results in isolated operation of all channels with each operating at its center frequency, without synchronism.

A pre-parallel check circuit 106 monitors the output of phase detector 80 and inhibits a bus tie breaker close signal at the output of AND gate 102 if the output of the phase detector exceeds a predetermined level. The channel controls 40 also include terminals for accepting signals commonly found in VSCF control circuits which affect the operation of the bus tie breaker. In particular, terminal 108 may receive an over torque/under torque trip signal, terminal 110 may receive an over excitation/under excitation trip signal, and terminals 112 and 114 may receive parallel disable or parallel enable signals respectively.

As shown in FIG. 2, if the normal clock fail line goes low, the backup clock channel will ground the input to the voltage controlled oscillator so that it runs at its center frequency. Since its control is grounded, it will not respond to any real load errors. It will therefore be the master reference for the rest of the system. The integrity of the backup clock signal at each generator control unit is checked indirectly through the protection circuits. If a channel receives a stuck backup clock signal and the backup clock is the selected clock, then that channel will begin to drift in frequency, resulting in a large real power unbalance. A separate protection circuit, not shown, will detect this error and isolate it from the paralleled bus by placing a signal on terminal 108. The remaining parallel channels will function normally in the parallel mode. In the event that the backup clock frequency is out of a predetermined frequency range, the backup clock failed line 36 will be forced high. All generator control units will receive the failed backup clock signal and all will be forced to isolate and run on their own voltage controlled oscillator's center frequency.

Figure 3:
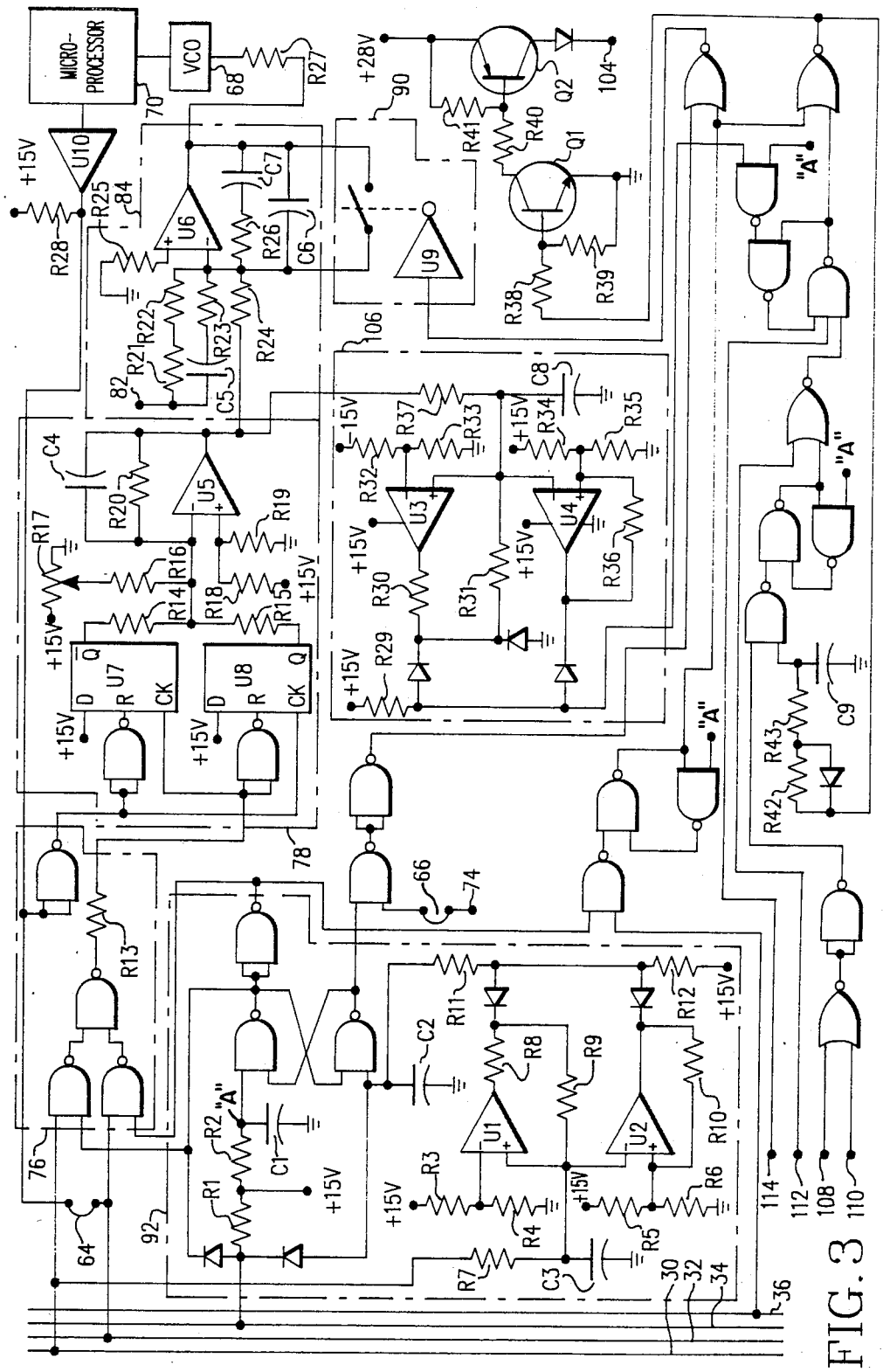
FIG. 3 is a schematic diagram of the control/monitoring circuits used in each channel of the system of FIG. 1.

FIG. 3 is a schematic diagram of a frequency control circuit which may be used in all of the channels of the system of FIG. 1. This circuit performs the functions illustrated in block 40 of FIG. 2.

Figure 4:
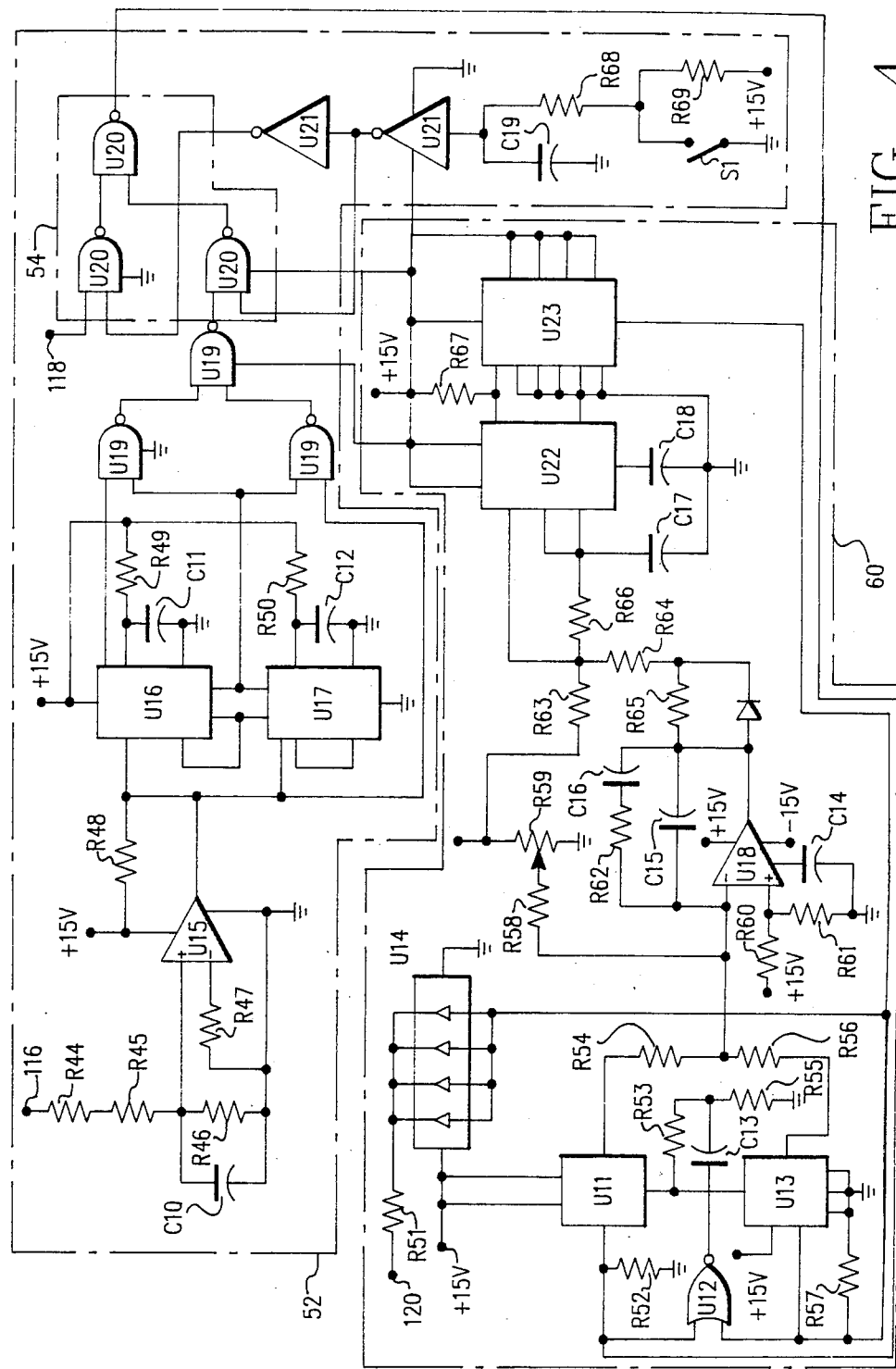
FIG. 4 is a schematic diagram of the clock circuit of FIG. 1.

FIG. 4 is a schematic diagram of the normal clock circuitry used in the system of FIG. 1. Terminal 116 receives either of the external frequency signals on terminal 56 or 58 in FIG. 2 and terminal 118 receives the crystal oscillator reference signal. Switch S1 is opened to select the crystal oscillator reference. The normal clock signal is produced on terminal 120.

A list of the major components used to construct the circuit of FIGS. 3 and 4 is given in Table I.

TABLE I

LIST OF COMPONENTS

| | |
|---|---|
| U1, U2, U3, U4 | CA3140 |
| U5, U6, U18 | HA5160 |
| U7, U8 | 14013 |
| U9 | HI-201-2 |
| U10 | 5407 |
| U11, U13 | 4013 |
| U12 | 4001 |
| U14 | 4050 |
| U15 | LM111 |
| U16, U17 | 4538 |
| U19, U20 | 4011 |
| U21 | 4049C |
| U22 | 555 |
| U23 | 4516 |
| C1, C9 | 1.0 μfd |
| C2 | 0.086 μfd |
| C3 | 3.0 μfd |
| C4 | 33 pf |
| C5 | 0.068 μfd |
| C6, C15 | 0.47 μfd |
| C7, C8 | 5.0 μfd |
| C10, C13 | 0.001 μfd |
| C11, C12 | 0.0047 μfd |
| C14 | 22 pf |
| C16 | 4.0 μfd |
| C17 | 0.0033 μfd |
| C18 | 0.01 μfd |
| C19 | 0.002 μfd |
| R1, R11, R12, R13, R14, R15, R18 R29, R43, R48, R52, R57, R69 | 10K |
| R2 | 500K |
| R3, R6 | 49.9K |
| R4, R5 | 32.2K |
| R7, R53, R59 | 20K |
| R8, R30 | 4.99K |
| R9, R10 | 510K |
| R16, R42, R44, R45, R49, R50, R55 | 100K |
| R17, R37 | 50K |
| R19 | 4.02K |
| R20 | 6.81K |
| R21, R22 | 22K |
| R23, R27 | 1.0K |
| R24, R25 | 3.16K |
| R26 | 1.5K |
| R28 | 1.8K |
| R31 | 10 M |
| R32 | 16.9K |
| R33, R35 | 100 Ω |
| R34 | 9.09K |
| R36, R66 | 20K |
| R38 | 9.1K |
| R40 | 825K |
| R41 | 220 Ω |
| R46, R47 | 3.3K |
| R51 | 500 Ω |
| R54, R56, R60, R61 | 4.42K |
| R58 | 27K |
| R62 | 7.5K |
| R63 | 19.6K |
| R64 | 340K |
| R65 | 19.1K |
| R67 | 5.0K |
| R68 | 90K |
| Q1 | 2N2222A |
| Q2 | 2N3721 |

All channels of the system of the present invention have the same clock selected as master, either normal or backup. In this manner, all channels will operate in synchronism whether paralleled or isolated, even if the normal clock fails. If the backup clock is selected, it is latched on until the system is shutdown. This prevents the system from cycling back and forth between clocks in an intermittent failed situation.

Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. A clock control system for an electric power system comprising:
    means for generating a master clock signal;
    means for generating a first signal for controlling a first channel of an electric power system, said first signal being initially phase locked to said master clock signal;
    means for generating a second signal for controlling a second channel of an electric power system, said second signal being initially phase locked to said master clock signal;
    means for monitoring the frequency of said master clock signal;
    means for decoupling said first and second signals from said master clock signal when said master clock signal is out of a preselected frequency range;
    means of operating the decoupled first signal at a preselected frequency to produce a backup clock signal; and
    means for phase locking the decoupled second signal to said backup clock signal.

2. A clock control system for an electric power system as recited in claim 1, wherein said means for generating a master clock signal includes:
    means for receiving a reference clock signal; and
    a first phase-locked loop for phase locking said master clock signal to said reference clock signal.

3. A clock control system for an electric power system as recited in claim 2, wherein said means for generating a first signal includes:
    a second phase-locked loop having a voltage controlled oscillator, wherein the operating frequency range of said second phase-locked loop encompasses the operating frequency range of said first phase-locked loop.

4. A clock control system for an electric power system as recited in claim 1, wherein said means for generating a first signal includes:
    a phase-locked loop having a voltage controlled oscillator; and
    means for connecting a predetermined reference voltage level to an input of said voltage controlled oscillator.

5. A clock control system for an electric power system as recited in claim 1, further comprising:
    means for monitoring the frequency of said backup clock signal; and
    means for electrically separating outputs of said first and second channels when said backing clock signal is out of a preselected frequency range.

6. A method of controlling a multiple channel electric power system, said method comprising the steps of:
    generating a master clock signal;

generating a first signal for controlling a first channel of an electric power system, said first signal being initially phase locked to said master clock signal;

generating a second signal for controlling a second channel of an electric power system, said second signal being initially phase locked to said master clock signal;

monitoring the frequency of said master clock signal;

decoupling said first and second signals from said master clock signal when said master clock signal is out of a preselected frequency range;

operating the decoupled first signal at a preselected frequency to produce a backup clock signal; and phase locking the decoupled second signal to said backup clock signal.

7. The method of claim 6, further comprising the steps of:

monitoring the frequency of said backup clock signal; and electrically separating outputs of said first and second channels when said backup clock signal is out of a preselected frequency range.

* * * * *